2,991,304
DIPHENYL-METHANE DERIVATIVES AND
PROCESS OF PREPARING THEM
Gustav Ehrhart, Bad Soden (Taunus), Heinrich Ott, Eppstein (Taunus), and Ernst Lindner, Frankfurt am Main, Germany, assignors to Farbwerke Hoechst Aktiengesellschaft vormals Meister Lucius & Bruning, Frankfurt am Main, Germany, a corporation of Germany
No Drawing. Filed May 5, 1959, Ser. No. 811,013
Claims priority, application Germany May 7, 1958
9 Claims. (Cl. 260—485)

It has been found that compounds of the general formula

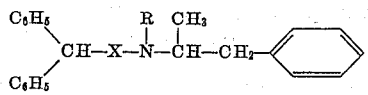

in which X represents a straight-chain or branched aliphatic hydrocarbon radical containing at most 3 carbon atoms and R represents an aliphatic acyl radical with at most ten carbon atoms containing salt-forming acid or basic groups, show very favorable cardiac and circulatory effects and, in view of the water-solubility of the corresponding non-toxic salts, can well be administered in the form of pharmaceutical preparations.

The present invention relates also to the preparation of such compounds by transforming diphenyl-methane derivatives of the indicated formula, wherein R stands for hydrogen, according to methods generally employed for acylation into the corresponding acyl derivatives of the above-identified formula and converting these in usual manner into non-toxic salts.

The starting substances of the above formula (R=H) can for example be prepared by catalytic hydrogenation of phenyl-acetone in the presence of corresponding diphenyl-alkylamines.

As amines of the above formula (R=H) there come into consideration: 2-[1,1-diphenyl-propyl-(3)]-amino-3-phenyl-propane, 2 - [1,1-diphenyl-ethyl - (2)] - amino-3-phenyl-propane, 2-[1,1-diphenyl - butyl - (3)] - amino-3-phenyl-propane, 2-[1,1 - diphenyl - butyl - (2)]-amino-3-phenyl-propane, 2-[1,1 - diphenyl-2-methyl - propyl-(3)]-amino-3-phenyl-propane.

The acylation is effected in known manner, for example, by reaction with suitable carboxylic acids that may be substituted or their reactive derivatives, for example halides or anhydrides. As such carboxylic acids there may be used: succinic acid, methyl-succinic acid, glutamic acid, acetyl-glutamic acid, bromo-acetic acid, bromopropionic acid, bromo-butyric acid, maleic acid, glutaric acid, chloroacetic acid, chloropropionic acid.

The acylation is carried out according to the reaction velocity by combining, longer or shorter heating, if desired in the presence of an agent splitting off hydrogen halide, such as pyridine or quinoline. The simultaneous use of inert solvents is advantageous. As such there are suitable, for example, benzene, toluene, ether, chloroform or methylene chloride. The reaction mixture is worked up in known manner, for example by elimination of the hydrogen halide formed by means of water and taking up of the reaction product in an organic solvent such as ether, chloroform or methylene chloride. When using acid anhydrides as acylation agent the reaction mixture is advantageously concentrated under reduced pressure.

If the acyl radical contains a halogen atom, it may be transformed with an amine in the usual manner into an amino-acetyl derivative. As such amines there may be used: dimethyl-amine, diethylamine, N,N-diethyl-ethyl-diamine, dipropylamine, dibutylamine, trimethylamine, triethylamine. The reaction with tertiary amines leads to water-soluble quaternary salts. The reaction is carried out in the usual manner, if desired in the presence of inert organic solvents such as benzene or toluene by heating, if desired in an autoclave.

The amines of the above formula (R=H) may likewise be reacted with keto-carboxylic acids or the reactive derivatives thereof, for example diketene, to yield the acetoacetyl derivatives. The reaction with diketene is advantageously carried out in the presence of a solvent such as benzene, toluene and methylene chloride. After evaporation of the solvent the acetoacetyl compound is directly obtained in a quantitative yield.

The reduction of a keto group being present in the introduced acyl radical can for example be carried out catalytically by means of metals of the eighth group of the Periodic System, preferably nickel catalysts, in the presence of customary solvents such as aqueous alcohols, alcohols or water. There may also be used noble metals or Raney catalysts. The reduction may also be effected with nascent hydrogen, for example with aluminum amalgam and alcohol, sodium amalgam, lithium aluminum hydride or sodium hydride. The reduction may also be carried out electrolytically.

The hydroxy group formed according to this method can be esterified, for example by means of dicarboxylic anhydrides. As such anhydrides there are suitable maleic anhydride or succinic anhydride, methyl-succinic anhydride, glutaric anhydride. The use of dicarboxylic anhydrides is of particular advantage since by transformation of the second carboxyl group into corresponding salts there are obtained compounds which—in the case of the alkali metal salts—render the products of the invention easily water-soluble, which is of particular advantage for the parenteral administration.

As far as the products of the invention contain a basic radical, they can be transformed into corresponding salts by means of mineral or organic acids so that water-soluble compounds are obtained therewith. As mineral acids there come into consideration: hydrohalic acids such as hydrochloric acid and hydrobromic acid, as well as sulfuric acid, phosphoric acid and amidosulfonic acid. As organic acids there may for example be mentioned: formic acid, acetic acid, propionic acid, lactic acid, maleic acid, succinic acid, tartaric acid, benzoic acid, salicylic acid, citric acid, aceturic acid, oxyethane-sulfonic acid and ethyl-diamine-tetraacetic acid. The products of the present invention can also be transformed into corresponding quaternary salts, preferably by means of alkyl halides.

The products of the present invention show an extremely favorable cardiac and circulatory effect. The administration of the 2-(1,1-diphenyl-propyl-(3)-diethyl-aminoacetyl - amino)-3-phenyl - propane in the rabbit's heart, prepared according to Langendorff, at a rate of flow of 20 micrograms per minute leads to a strong dilatation of coronary vessels which reaches a maximum with 30 micrograms per minute. Even when the infusion is discontinued the increase of flow is still maintained for a prolonged time. The intravenous injection of a 0.1% solution into the congested ear veins of the rabbit's ear leads only to a very small irritative action.

The products of the invention cause already a dilatation of the coronary and peripheral vessels when administered in such a small dose that the toxicity in the case of 2 - [1,1 - diphenyl - propyl - (3) - diethylaminoacetyl-amino]3-phenyl-propane with 15 mg./kg. is practically negligible. Apart from causing a dilatation of the coronary vessels, the sodium salt of the 2-[1,1-diphenylpropyl-(3)-β-hydroxybutyrylamino]-3-phenyl-propane hemisuccinate shows a distinctly positive inotropic action on the heart muscle. When tested clinically, the mentioned compound shows likewise a dilatory effect on the vessels, particularly on the coronary vessels. In addition, it

3 causes an increased peripheric blood circulation. The dilatation of the coronary vessels sets in very rapidly and, compared with the known nitro compounds, for example the tetranitric acid ester of the erythrol, the effect is maintained for a prolonged time (several hours). The single dose amounts to about 5–10 mg.

The products of the invention can be administered parenterally or per os in the form of corresponding salts or also in admixture with pharmaceutically suitable carriers. In the case of oral administration they may be given preferably in the form of tablets or dragees into which the products of the invention are worked up as active substances together with the usual carriers such as lactose, starch, tragacanth and magnesium stearate.

The following examples illustrate the invention but they are not intended to limit it thereto:

*Example 1*

10 grams of 2-(1,1-diphenyl-propyl-3-amino)-3-phenyl-propane are heated for 4 hours on the steam bath with 10 grams of chloracetyl chloride. After addition of a little water and ether the ethereal layer is separated and washed by means of water and dilute sodium carbonate solution. After drying and distilling off the ether there remain 13.3 grams of a light brown oil. These are dissolved in 25 cc. of benzene, 10 cc. of diethylamine are added and the whole is boiled for one hour under reflux. The separation of the diethylamine hydrochloride is complete after addition of ether. After filtering with suction dilute hydrochloric acid is added to the filtrate. The oily hydrochloride of the diethylamino-acetyl compound separates as third layer in the form of an oil. The latter is separated, dissolved in water and made alkaline by means of dilute sodium carbonate solution. After extraction by means of ether, drying and distilling off the ether, there are obtained 11.6 grams of 2-(1,1-diphenyl-propyl-(3)-diethylamino-acetylamino)-3-phenyl-propane. When titrating with 1/10 N-hydrochloric acid the calculated quantity is used up. After concentration there results an oily hydrochloride of the above base.

*Example 2*

3 grams of 2-(1,1-diphenyl-propyl-(3)-amino)-3-phenyl-propane dissolved in 15 cc. of benzene are boiled for 8 hours under reflux with 3 grams of chloracetyl chloride. After addition of water the benzene layer is separated, washed with dilute sodium carbonate solution and dried. After distilling off the benzene, there result 3.7 grams of a light-brown oil. These are dissolved in 15 cc. of benzene and heated for 2 hours in the tube at 100° C. with 10 cc. of a benzene solution of trimethylamine of 31% strength. After concentration there are obtained 5.3 grams of 2-(1,1-diphenyl-propyl-(3)-dimethylamino-acetylamino)-3-phenyl-propane chlormethylate in the form of an oily residue that solidifies on prolonged standing.

*Example 3*

5 grams of the chloracetyl compound obtained according to Examples 1 or 2 are dissolved in 5 cc. of toluene and heated for 2 hours on the steam bath with 3 grams of 1-diethylamino-ethyl-(2)-amine. The whole is then diluted with water and ether, the ethereal layer is separated and washed by means of water. The ether solution is extracted by means of dilute hydrochloric acid, the aqueous acid solution is filtered with animal charcoal and made alkaline with dilute sodium hydroxide solution. After extraction by means of ether, drying and distilling off the ether, there are obtained 5.1 grams of 2-(1,1-diphenyl-propyl-(3)-diethylamino-ethylaminoacetyl-amino)-3-phenyl-propane in the form of a light sirup. When titrating with 1 N-hydrochloric acid the calculated quantity is used up. After concentration there results the oily hydrochloride.

4

*Example 4*

4 grams of 2-(1,1-diphenyl-propyl-(3)-amino)-3-phenyl-propane are heated for 90 minutes on the steam bath with 10 cc. of pyridine and 4 grams of succinic anhydride. The pyridine is eliminated under reduced pressure. The residue is taken up in ether, and washed with a solution of dilute hydrochloric acid in water. The ether solution is extracted by means of dilute sodium carbonate solution. The aqueous alkaline solution is acidified with dilute hydrochloric acid, whereupon an oily product separates. The latter is taken up in ether, the ether is dried and distilled off. There are obtained 4.95 grams of 2-(1,1-diphenyl-propyl-(3)-succinylamino)-3-phenyl-propane. When titrating the latter by means of a 2 N-solution of sodium hydroxide the calculated quantity is used up. After filtration and concentration there is obtained the very easily water-soluble sodium salt.

*Example 5*

(a) 5 grams of diketene are added to a solution of 16.5 grams of 2-(1,1-diphenyl-propyl-(3)-amino)-3-phenyl-propane in 5 cc. of benzene. After standing for 12 hours the whole is heated for a short time on the steam bath and the benzene is distilled off. There result 22 grams of a viscous oil. These are dissolved in 50 cc. of methanol. Some drops of water and 1 gram of sodium boron hydride are added, whereupon warming sets in. After 15 minutes the whole is acidified by means of dilute hydrochloric acid, the methanol is distilled off under reduced pressure and the residue is taken up in ether. There are obtained 19 grams of 2-(1,1-diphenyl-propyl-(3) - β - hydroxybutyrylamino) - 3 - phenyl - propane in the form of a colourless oil.

(b) 19 grams of the compound obtained according to Example 5a are heated for one hour on the steam bath with 20 grams of succinic anhydride and 50 cc. of pyridine. The pyridine is distilled off under reduced pressure and ether and dilute hydrochloric acid are added to the residue. The ether is eliminated, washed with water and then extracted with a dilute sodium carbonate solution. The alkaline aqueous solution is acidified and extracted by means of ether. There are obtained 24 grams of 2 - (1,1 - diphenyl - propyl - (3) - β - hydroxybutyrylamino)-3-phenyl-propane hemisuccinate. These are dissolved in a little methanol, water is added until turbidity sets in and 2.48 grams of sodium carbonate are added. After filtration and concentration there results the sodium salt of the above succinic acid semi-ester in the form of a foamy, easily water-soluble residue.

*Example 6*

11 grams of 2-[1,1-diphenylbutyl-(3)-amino]-3-phenyl propane are transformed according to Example 1 with 10 grams of chloracetyl chloride into the chloracetyl compound, which is obtained in the form of 12.9 grams of a light-brown oil. These are reacted with 12 cc. of diethylamine according to Example 1. When titrating with 1/10 N-hydrochloric acid, the calculated quantity of hydrochloric acid is used up. There is obtained the oily hydrochloride of the 2-[1,1-diphenylbutyl-(3)-diethylamino-acetyl-amino]-3-phenyl-propane.

We claim:

1. A member of the group consisting of (1) diphenyl methane derivatives of the formula:

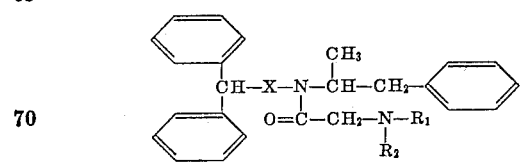

in which X represents an alkylene group containing from one to three carbon atoms, $R_1$ is a member of the group consisting of hydrogen, methyl and ethyl, $R_2$ is a member of the group consisting of methyl, ethyl and the radical

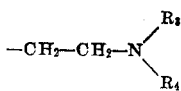

in which $R_3$ and $R_4$ are members of the group consisting of methyl and ethyl; (2) the non-toxic acid addition salts of said derivatives; and (3) diphenyl methane derivatives of the formulae:

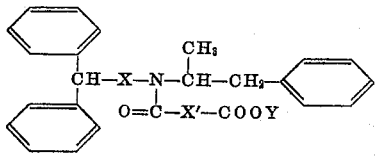

and

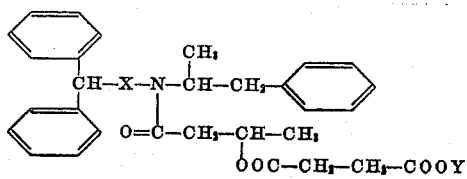

in which X represents an alkylene group containing from one to three carbon atoms, X' represents an alkylene group containing from two to three carbon atoms, and Y represents a member of the group consisting of hydrogen and alkali metal cation.

2. 2 - [1,1-diphenyl-propyl-(3)-diethylaminoacetylamino]-3-phenyl-propane.

3. 2 - [1,1-diphenyl-propyl-(3)-diethylaminoacetylamino]-3-phenyl-propane hydrochloride.

4. 2-[1,1-diphenyl-propyl-(3)-diethylaminoethylaminoacetylamino]-3-phenyl-propane.

5. 2-[1,1-diphenyl-propyl-(3)-diethylaminoethylaminoacetylamino]-3-phenyl-propane hydrochloride.

6. 2-[1,1-diphenyl-propyl-(3)-β-hydroxybutyrylamino]-3-phenyl-propane.

7. 2-[1,1-diphenyl-propyl-(3)-β-hydroxybutyrylamino]-3-phenyl-propane hemisuccinate.

8. 2-[1,1-diphenyl-propyl-(3) - succinylamino]-3-phenyl-propane.

9. Sodium salt of 2-[1,1-diphenyl-propyl-(3)-succinylamino]-3-phenyl-propane.

No references cited.